Figure 1:
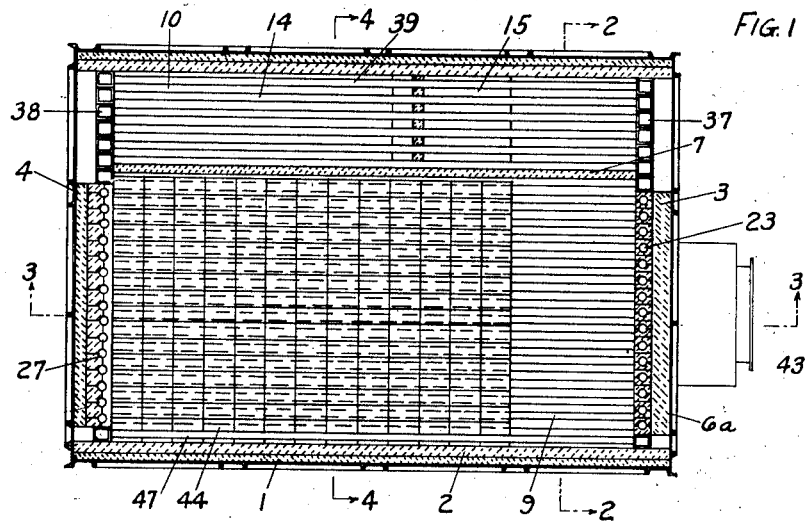

Jan. 26, 1943.　　　　　F. G. BRINIG　　　　　2,309,334
STEAM GENERATOR
Filed Nov. 6, 1937　　　　9 Sheets-Sheet 1

Frank G. Brinig
INVENTOR.
BY
ATTORNEYS.

Jan. 26, 1943. F. G. BRINIG 2,309,334
STEAM GENERATOR
Filed Nov. 6, 1937 9 Sheets-Sheet 3

Frank G Brinig
INVENTOR

BY *H Z Lord*
ATTORNEYS.

Jan. 26, 1943.                F. G. BRINIG                2,309,334
                            STEAM GENERATOR
                         Filed Nov. 6, 1937            9 Sheets-Sheet 4

Frank G. Brinig
INVENTOR.
BY
ATTORNEYS.

Jan. 26, 1943.        F. G. BRINIG        2,309,334
STEAM GENERATOR
Filed Nov. 6, 1937        9 Sheets-Sheet 9

Patented Jan. 26, 1943

2,309,334

UNITED STATES PATENT OFFICE 2,309,334

STEAM GENERATOR

Frank G. Brinig, Erie, Pa., assignor to Erie City Iron Works, Erie, Pa., a corporation of Pennsylvania Application November 6, 1937, Serial No. 173,105

5 Claims. (Cl. 122—235)

The present invention, as specifically exemplified, involves briefly a combustion chamber and a convection chamber arranged side by side, a cross drum extending across said chambers, a set of tubes in the combustion chamber subjected to radiant heat, a set of tubes in the convection chamber, these sets of tubes being in a circulating system hooked up with the drum. This, as specifically exemplified, is accomplished by downwardly extending headers from the drum to which lower ends of the two sets of tubes are connected, and headers at the high ends of the two sets of tubes. Preferably the tubes are extended from the headers in the combustion chamber to form a water cooled wall, and tubes are arranged in the combustion chamber at the side walls to provide water cooled walls at the sides, these all being hooked into the circulating system leading to the drum. Preferably also the furnace bottom is supplied with tubes connected into the circulation. Return tubes are arranged under the furnace roof.

In a preferred form the invention also contemplates the introduction of superheaters below the roof tubes and the main tubes of the chambers. Also an economizing chamber may be arranged at one side of the furnace, preferably at the side of the convection chamber, and provided with a set of tubes corresponding to the convection tubes. These are connected to an extension of the drum arranged over the economizer chamber, the drum being partitioned to direct the water from the intake initially to the economizer tubes and from these tubes to the drum.

This structure provides many definite advantages over those in common use among which may be enumerated:

The furnace as a whole is comparatively low so that it may be readily arranged in spaces having low head room.

It may be extended from side to side or up and down without large changes in the arrangement so as to accommodate the location in which it is set.

The outer walls present a comparatively small exposed surface with a consequent low heat loss from such exposure.

The center of gravity of the structure is lower than that of ordinary structures of equal capacity. This makes the structure particularly desirable for marine settings.

It permits of the use of straight tubes, the entire boiler being accommodated with tubes of substantially the same size and of few variations in length.

The drum may be arranged across the different chambers and so be directly connected and exposed with the tubes in each chamber and receive some heat directly from the chambers.

The same tube construction as is used in the convection chamber may be utilized for water-cooling the side walls of the combustion chamber.

The headers receiving steam generating tubes in the combustion chamber may be extended by means of tubes for water-cooling the front and rear walls of the combustion chamber.

The headers for the convection tubes may be of a length and vertically arranged to give the desired bank depth of the convection tubes.

The flow of gases may be directed cross-wise of the tubes wiped by the gases practically throughout the entire travel of the gases.

The most active steaming tubes are more nearly related to discharges to the drum than the less active tubes and consequently the circulation encounters less resistance in accommodating the circulating system, and involves less resistance in accommodating the steam release and flow thereof toward the drum.

The convection chamber may provide a down and up flow-path for the gases with change of velocity at the bottom to induce a deposit of ash at the bottom of the convection chamber.

The furnace accommodates almost without change different kinds of fuel and different methods of introduction.

It provides a simple stack connected both as to gas out-flow and stack support. It provides a simple supporting means, the boiler being carried by the active parts of the boiler from the chamber bottoms.

The bottoms of the furnace and convection chamber lend themselves readily to an arrangement for simple ash removal.

The structure also lends itself readily to utilizing duplicate parts for forming an economizer structure.

The invention contemplates several additions as, for instance, an air heater may be introduced at the bottom of the economizer chamber with very little addition in expense and no added space. The generator may be doubled by arranging the combustion chambers side by side with water walls between, or by arranging the furnaces at the outer sides and providing a single convection chamber between the furnaces.

Figure 2:
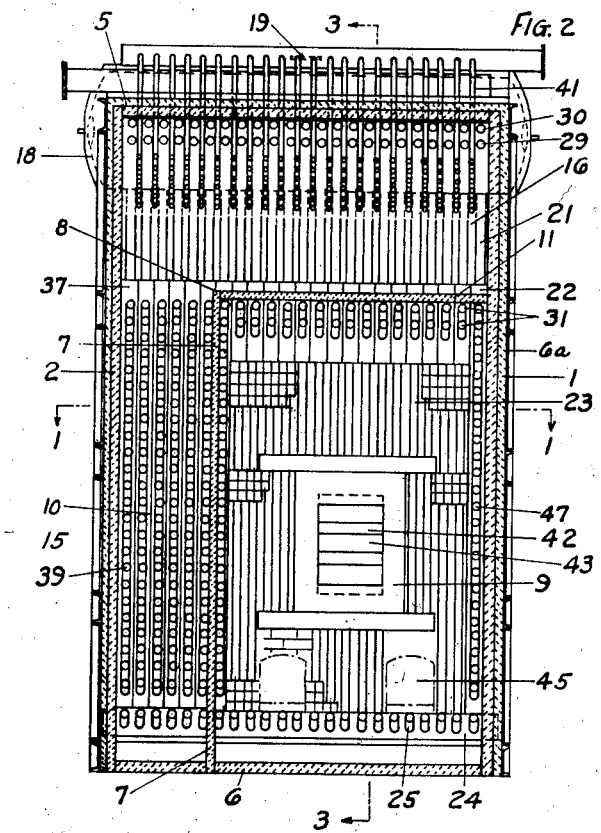
Figure 3:
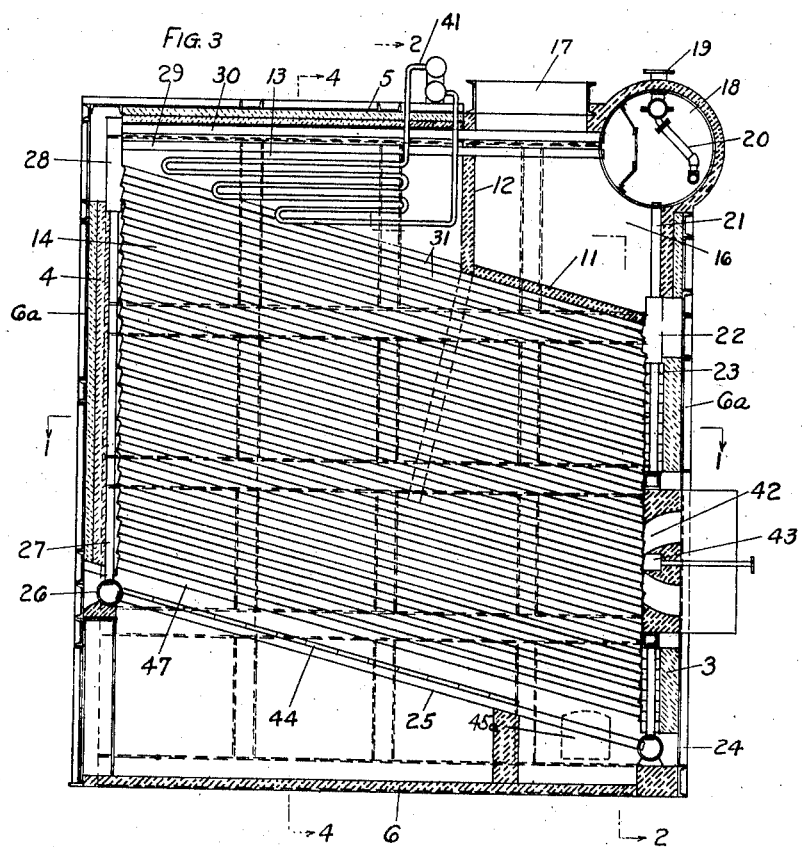

Features and details will appear from the specification and claims. A preferred embodiment of the invention is exemplified in the drawings as follows:

Fig. 1 shows a section on the lines 1—1 in Figs. 2 and 3.

Fig. 2 a section on the lines 2—2 in Figs. 1 and 3.

Figure 4:
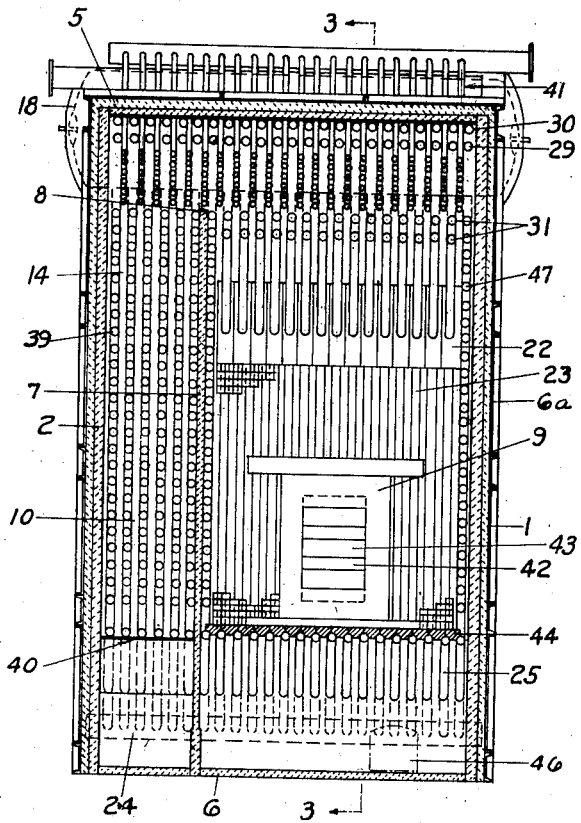

Fig. 3 a section on the lines 3—3 in Figs. 1, 2 and 4.

Fig. 4 a section on the lines 4—4 in Figs. 1 and 3.

Figs. 5, 6, 7, 8 and 9, alternative forms of the tubes of the slag screen.

Figure 10:

Fig. 10 a side elevation of a short header.

Figure 11:

Fig. 11 a similar elevation viewed from the inside of the furnace.

Figure 15:
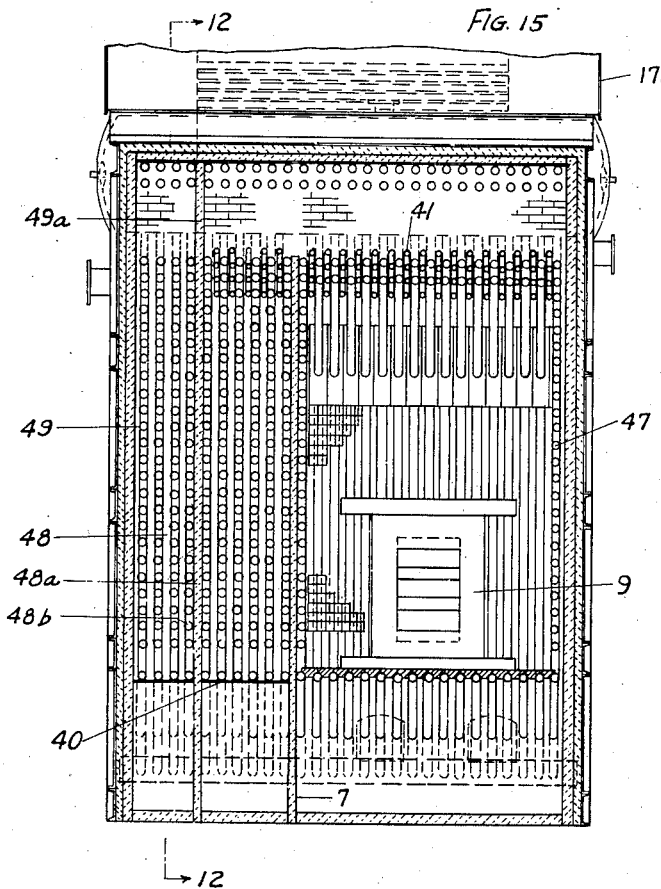

Fig. 12 a section showing an alternative form adding an economizer, the section being on the line 12—12 in Fig. 15.

Figure 13:
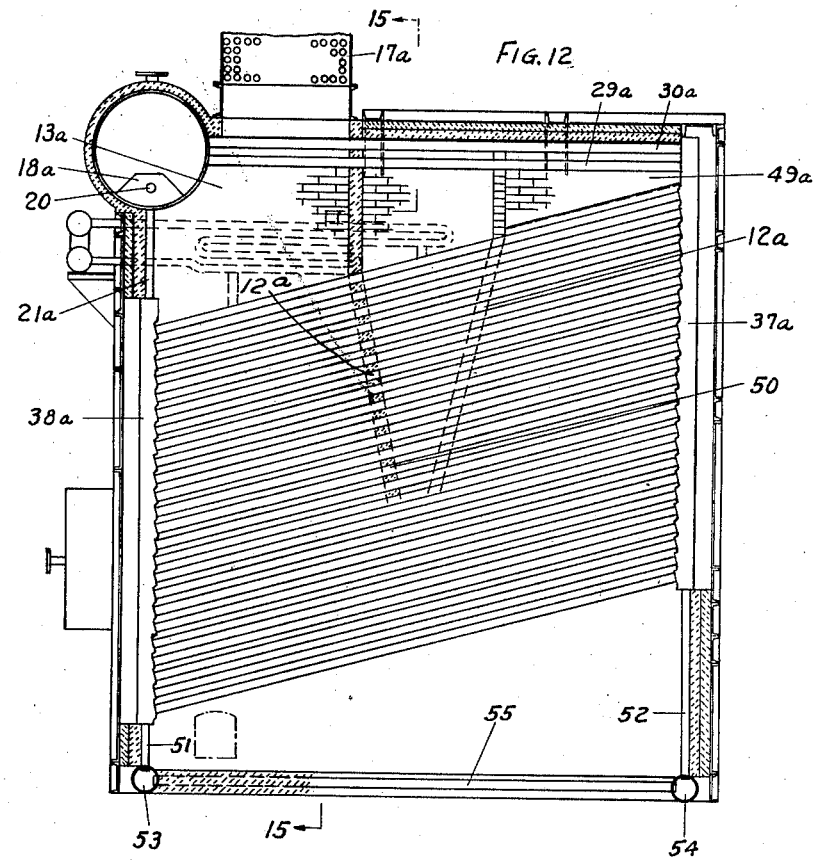

Fig. 13 a section of the drum on the line 12—12 in Fig. 15, showing the economizer down tube partition plate.

Figure 14:
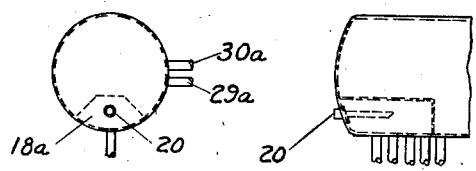

Fig. 14 a side elevation of the end of the drum showing a face view of the down flow tubes of the economizer.

Fig. 15 a section on the line 15—15 in Fig. 12.

Figure 16:
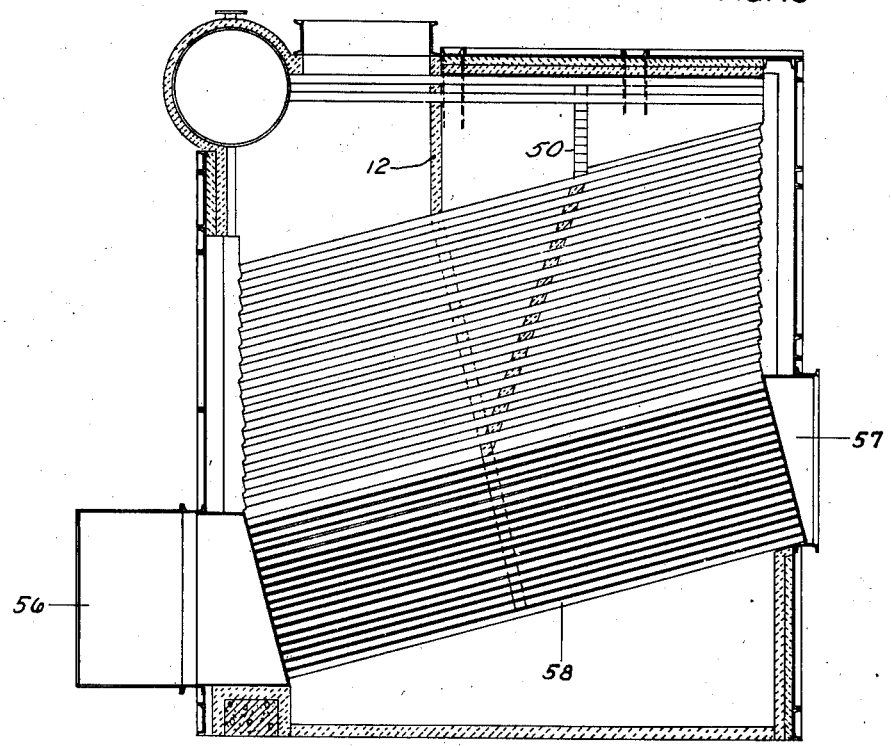

Fig. 16 an alternative form showing an air heater in the economizer chamber.

Figure 17:
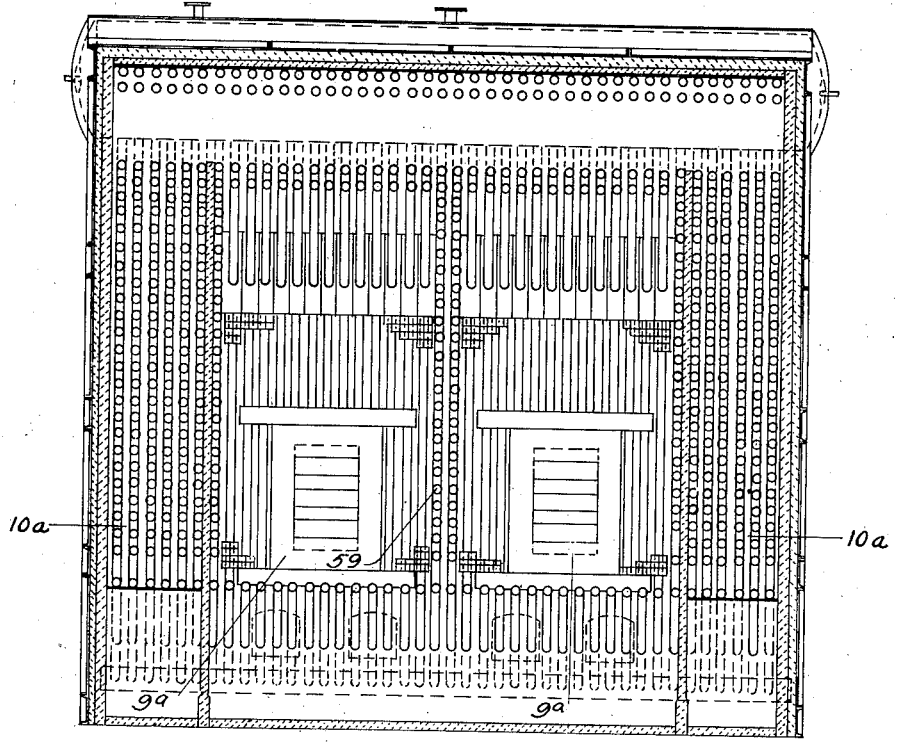

Fig. 17 a section similar to Fig. 4, of a pair of units similar to the unit shown in Figs. 1 to 4 with the combustion chambers side by side.

Figure 18:
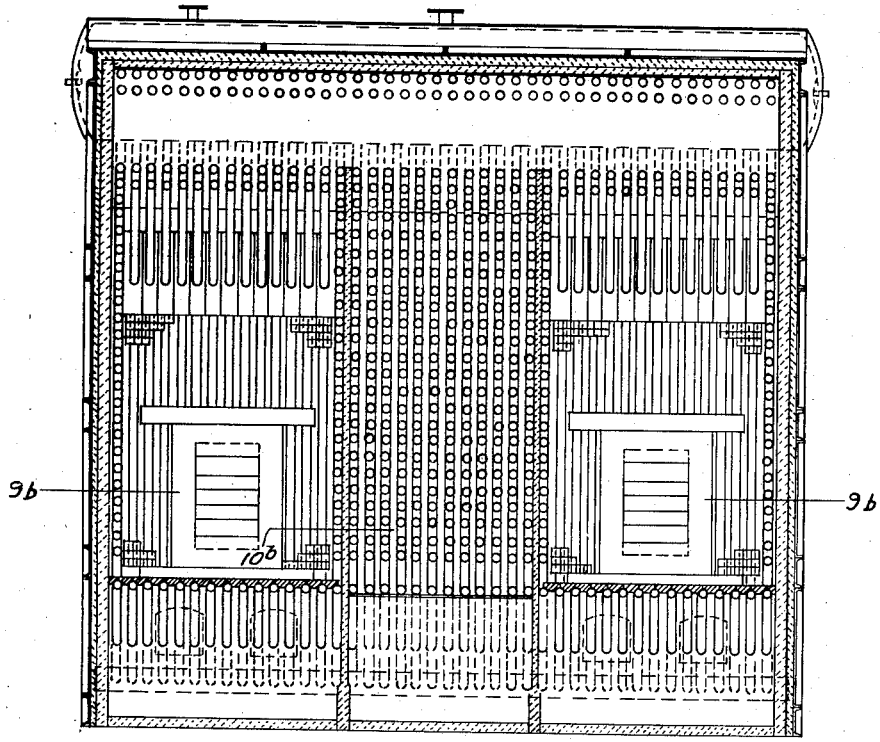

Fig. 18 a pair of units similar to Figs. 1 to 4 showing a section similar to Fig. 4 in which the combustion chambers are on the outside and the convection chambers are combined at the center.

Figure 19:
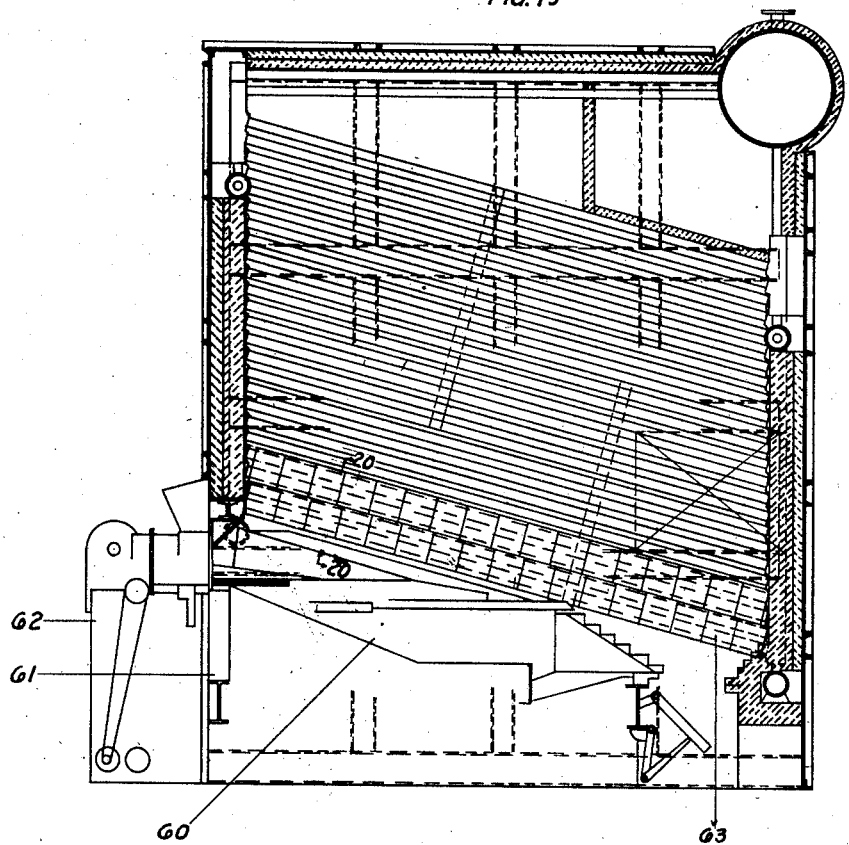

Fig. 19 shows a central section similar to Fig. 3 but showing a stoker installation.

Figure 20:

Fig. 20 a section on the line 20—20 in Fig. 19, showing clinker chills for the water wall tubes adjacent the stoker.

In Figs. 1 to 4 the furnace is within walls forming an inclusive rectangular furnace structure. It has the outer side walls 1 and 2, front wall 3, rear wall 4, roof 5, bottom 6. The furnace walls are surrounded by a steel casing 6a if desired. A wall of refractories 7, terminating at 8, at a point below the roof, separates the included space into a combustion chamber 9 and a convection chamber 10. A baffle 11 is extended across the combustion space near the top thereof and a baffle 12 extending downwardly from the roof closes the space between baffle 11 and the roof providing an opening 13 over the top 8 between the combustion chamber and the convection chamber. The convection chamber has a down passage 14 at the rear of the chamber which extends below the extension of the baffle 12 and an up-flow passage or portion in the convection chamber 15 which connects to the chamber 16 above the baffle 11. A smoke-outlet or connection 17 extends from the chamber 16.

A drum 18 extends across both chambers at the front of the furnace. It has the steam outlet 19 leading from the drum in the usual manner. It is also provided with a feed-water inlet 20 leading to the drum in the usual manner, the drum having the usual baffles or deflectors for steam separation.

Down-flow tubes 21 extend in a row the full length of the drum. These tubes in the combustion chamber lead to short headers 22. Tubes 23 are connected at the lower end of these short headers and extend downwardly cooling the front wall of the furnace. The lower ends of the tubes 23 lead into header 24 which extends entirely across the furnace. Tubes 25, slightly inclined, extend from the header 24 at the bottom of the combustion chamber to a header 26, the header 26 extending entirely across the furnace. Tubes 27 extend upwardly from the header 26 to short headers 28. Return tubes 29 and 30 under the roof of the furnace connect the upper ends of the headers 28 with the drum. These vertical down-flow tubes and horizontal return tubes extending entirely across the furnace are in rows in their entry to the drum and extend in parallel planes therefrom. The entire circulation passes through these rows of tubes 29, 30 and 21.

Figure 5:
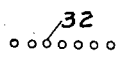
Figure 6:
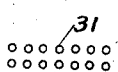
Figure 7:
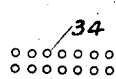
Figure 8:
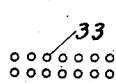
Figure 9:
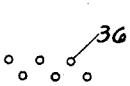

A slag screen formed of tubes 31 is arranged over the combustion chamber below the baffle 11 and spaced from tubes 29 and 30. These tubes connect the short headers 22 and 28, these headers being shown in Figs. 10 and 11, and having inclined faces and openings to receive the slag screen tubes. This slag screen may be made up with various formations as, for example, shown in Figs. 5, 6, 7, 8, and 9; Fig. 5 showing tubes 32 forming a single bank of tubes; Fig. 6 being provided with tubes 31 forming a double bank, as in Figs. 1, 2, 3 and 4; and Fig. 7 being provided with tubes 34 forming three banks, every other tube being left out of the bottom series. Fig. 8 shows an arrangement having three banks of tubes 33.

Down-flow headers 37 extend from top to bottom at the front of the convection chamber and these are connected with the drum by tubes 21, and with the header 24 at the bottom by suitable nipples. Up-flow headers 38 are provided at the rear of the convection chamber and are connected at the bottom by nipples with the header 26. The upper ends of the headers 38 are connected by return tubes 29 and 30 with the drum. More banks may be used, if desired. A set or bank of convection tubes 39 connects the headers 37 and 38. These headers have the inclined faces (see Figs. 10 and 11) extending through the tube area, the inclinations being similar to those of the tubes connecting the short headers 22 and 28. It will be noted that all the cross tubes, such as the slag screen 31 and the convection tubes 39, are slightly inclined, but with this inclination the tubes are nearer horizontally than vertically arranged and therefore the tube scheme of this generator is generally referred to as the horizontal type.

A superheater coil 41 extends between the slag screen and the return tubes 29 and 30. Preferably these superheater coils extend not only across the combustion chamber, but also the convection chamber. These coils are connected in the usual manner with the drum.

Burner openings 42 are provided at the front of the furnace and a burner 43 of any desired type is arranged in these openings. A furnace floor 44 of iron or refractory is arranged on the water tubes 25 at the rear of the furnace, the front end of this floor terminating short of the front of the furnace permitting the ash to be blown down this inclined floor and into position in the ash pit to be readily removed. In case of oil or gas the floor may be extended.

Front and rear doors 45 and 46 are provided at the front and rear of the furnace for access and the removal of ashes. A plate 48 forms a floor for the convection chamber, this plate being shorter than the length of the convection chamber so that the ash deposited thereon may be readily blown to the front end of the furnace where it may be readily removed from one of the ash pit doors, 45a.

Wall cooling tubes 47 are arranged at each side of the combustion space. These tubes correspond to the convection tubes and are connected at their ends with headers corresponding to the convection headers, the wall tubes at the wall 7 being merely an extra bank of the convection tubes which is arranged in the wall and a similar arrangement of tubes 47 are provided at the outer wall of the combustion space.

In the operation of the furnace, gases pass through the slag screen 31 and then are diverted sideways passing through the superheater tubes. It will be noted that the gases pass in a general direction crossways of the tubes of the slag screen and also crossways of the tubes of the superheater, thus wiping these tubes for maximum heat exchange. The gases pass through an opening 13 as they pass along the superheater tubes, then downwardly in front of the baffle 12 to an opening at the bottom of this baffle. This opening is sufficiently large so that there is a change in direction at this point and also some change in velocity so that the light ash is deposited on the plate at the bottom of the convection chamber where it may be readily blown off. The gases proceeding upwardly at the rear of the baffle 12 reach the chamber 16 and thence the smoke discharge 17. It will be noted here that the gases wipe the convection tubes crossways, thus affording an efficient heat exchange.

It will be noted that all the tubes in this construction are straight tubes and that the wall cooling tubes of the furnace correspond to the convection tubes, that all the long vertical headers are alike and all the short headers are alike. All these headers are connected with the drum in like manner by the tubes 21 which extend entirely across the furnace, and that the return tubes 29 and 30 return all these headers in like manner to the drum. Thus the variety of parts is reduced to a minimum.

It will also be noted that the entire circulating system is directly included within the walls of the furnace and corresponds to the other tube structures and connections utilized in the furnace. The lower water screen or floor tubes are of the same length and correspond to the convection tubes and the slag screen tubes.

It will be noted that the furnace may be expanded laterally without materially changing any of the parts except the extension of the drum and the addition of the necessary headers and the connecting tubes to the added headers; that it may be extended upwardly if desired when space requires it without material change in the main construction, that the outer wall surface is comparatively small considering the volume of the furnace. The arrangement also provides the heavy steaming tubes such as the slag screen and the upper tubes of the convection space nearest the drum so that the release or resistance to flow in the discharge of these tubes is the least of the system thus preventing an undue obstruction to free flow of all parts of the system.

In Figs. 12 and 15 I have shown a modification in which an economizer chamber is added at the side of the convection chamber. This economizer chamber 48 is separated from the convection chamber by a wall 48a. A set of economizer tubes 49 fills the economizer chamber, these tubes being similar to the convection tubes and being supplied with headers similar to the headers 37 and 38 of the convection chamber, the wall between the convection chamber and the economizer chamber being supplied with one set of tubes 48b, duplicating the structure between the combustion chamber and the convection chamber. The opening 13a between the combustion chamber and the convection chamber is reversed from that shown in Figs. 1 to 4, being at the low end of the tubes and the gases entering the convection chamber take a downward sweep by reason of the baffle 12a. The up-flow end of the convection chamber then communicates through an opening 49a with the economizer chamber where the gases flow downwardly back of a baffle 50 and upwardly to the smoke discharge 17a. In this structure the down-flowing headers are connected to a water-receiving space 18a in the drum to which the water supply pipe 20 leads. The return tubes 29a and 30a of this structure lead back to the drum in the same manner as the other return tubes and connect therewith but above the chamber 18a so that the economizer water reaches the drum heated from the waste gases from the convection space. Here it will be noted that this added structure utilizes the same type of parts with substantially the same type of connections that are utilized in the convection chamber and this provides a very economical and yet very efficient form of structure.

The lower part of the furnace may correspond exactly with Figs. 1 to 4 but if preferred the extensions 51 and 52 may be provided from the vertical headers to the lower headers 53 and 54, these headers being connected by horizontal tubes 55 at the bottom of the furnace. In some cases this added space may be desirable.

In Fig. 16 I show a further modification in which an air heater is arranged at the bottom of the economizer. Openings 56 and 57 are provided at the front and rear end of the economizer and a bank of tubes 58 extend from the opening 56 to the opening 57. These tubes are in the path of the gases through the economizer, the floor of the economizer chamber being preferably lowered to the bottom so as to accommodate the return of the gases in passing the air heater. This air of course may be used in the firing of the furnace, or for any other purpose that may be desired.

In Fig. 17 I show a structure in which two pairs of chambers are used. These pairs are substantially the same as those in Figs. 1 to 4, the combustion chambers 9a being at the center and the convection chambers 10a at the outside. The combustion chambers 9a may be separated merely by a set of tubes 59 which correspond to the wall tubes 47 of Figs. 1 to 4 and may be supplied with refractories, or the refractories may be omitted as indicated in the drawings. The operation of this double furnace is substantially that as shown in Figs. 1 to 4.

In Fig. 18 another alternative structure is shown in which there are in effect two furnaces similar to Figs. 1 to 4, the combustion chambers 9b—9b here being at the outside and the convection chambers being united into a chamber 10b at the center. Otherwise the structure is or may be similar to that of the Figs. 1 to 4.

In Fig. 19 a furnace similar to that shown in Figs. 1 to 4 except for the floor arrangement is arranged with an underfeed stoker 60, this stoker extending through the opening in the wall of the furnace and the bottom of the combustion chamber and being supplied with a stoker operating mechanism 62 outside the wall. The upper part of the furnace, the combustion chamber and convection chamber, follows that of Figs. 1 to 4. The lower wall cooling tubes at the sides of the furnace may be protected if desired by clinker chill castings 63 which are supported by the lower tubes at the sides as clearly shown in Fig. 19 and the section in Fig. 20.

What I claim as new is:

1. In a steam generator, the combination of a furnace comprising a combustion chamber and connected convection chamber arranged side by side; and a circulating system comprising a drum extending across both chambers; downwardly connecting headers leading from the drum along the wall of the furnace; a horizontal header connected with the lower ends of said downflow headers; tubes connected with said downflow headers extending across the furnace in both chambers; floor tubes connected with the lower header and extending across both chambers of the furnace; a horizontal header connected with the opposite ends of the floor tubes; up-flow headers at the opposite side of the furnace from the down-flow headers, said up-flow headers being connected to the last mentioned horizontal header and the steam generator tubes; and return connections between the up-flow headers and the drum.

2. In a steam generator, the combination of a box-shaped furnace having opposing walls one including up-take headers and the other down-take headers; horizontally disposed headers tying the bottoms of the up-take and down-take headers and the tops of one set of the headers, the bottom headers being at the bottom of the furnace; a series of horizontal type tubes connecting said up-take and down-take headers across the open space of the furnace; a side wall comprising horizontal type tubes connected with the up-take and down-take headers; a series of bottom tubes of horizontal type connecting the bottom headers, all of said tubes being parallel; and a casing enclosing said furnace.

3. In a steam generator, the combination of a box-shaped furnace having opposing walls one including up-take headers and the other down-take headers; horizontally disposed headers tying the bottoms of the up-take and down-take headers and the tops of one set of the headers, the bottom headers being at the bottom of the furnace; a series of horizontal type tubes connecting said up-take and down-take headers; a side wall comprising horizontal type tubes connected with the up-take and down-take headers; a casing enclosing said furnace, said casing being adjacent to the up-take and down-take headers and side wall tubes, said furnace chamber being divided by a wall comprising a vertical series of tubes connecting the up-take and down-take headers and dividing the chamber into a combustion space and convection space; and convection tubes in the convection space, all of said tubes being parallel.

4. In a steam generator, the combination of a box-shaped furnace having opposing walls one including up-take headers and the other down-take headers comprising an intervening wall dividing the furnace into a combustion space and a convection space side by side; horizontally disposed headers tying the bottoms of the up-take and down-take headers and the tops of one set of the headers, the bottom headers being at the bottom of the furnace; a series of horizontal type tubes in the combustion space connecting said up-take and down-take headers; a side wall comprising horizontal type tubes connected with the up-take and down-take headers; a casing enclosing said furnace, a vertical series of tubes connecting the up-take and down-take headers in the intervening wall; convection tubes in the convection space; a top wall series of tubes above the tubes in the combustion and convection chambers; a connection between the convection space and the combustion space limited to one end of the furnace; a downwardly extending baffle in the convection space making a down and then an upward pass; and a superheater at the connection end of the furnace between the series of tubes in the combustion and convection spaces and the top wall tubes.

5. In a steam generator, a furnace of box form having a combustion space and a convection space side by side and each extending substantially the full length of the furnace; water-cooled walls surrounding the furnace and between the combustion and convection space; a connection between the combustion space and convection space limited to one end of the furnace; and a baffle in the convection space making a down-pass and an up-pass in the convection space, the up and down passes being arranged side by side and adjacent to the dividing wall, the passes extending the full length of the convection and combustion chambers.

FRANK G. BRINIG.